Patented Oct. 12, 1948

2,450,878

UNITED STATES PATENT OFFICE 2,450,878

3-TERTIARY-BUTYL-4-ALKOXY-5-NITRO BENZALDEHYDES

Marion Scott Carpenter, Nutley, and William M. Easter, Jr., Lodi, N. J., assignors to Burton T. Bush, Inc., New York, N. Y., a corporation of New Jersey No Drawing. Application May 24, 1947, Serial No. 750,356

7 Claims. (Cl. 260—599)

This invention relates to novel synthetic musk materials and to a process for preparing them. More especially, the present invention relates to 3-tertiary-butyl-4-alkoxy-5-nitro benzaldehyde.

The structural formula of our novel materials may be represented as follows:

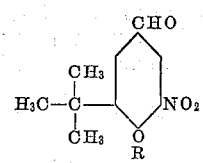

wherein R may be a methyl or ethyl radical. These new mono-nitro aromatic aldehydes are pale yellow crystalline materials having strong musk-like odors. They may be employed in perfumes and cosmetics.

Our novel musk materials are prepared by mild nitration of the corresponding non-nitrated products, which themselves are prepared by heating a material having the structural formula:

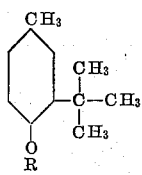

wherein R is a methyl or an ethyl radical, with an oxidation agent such as manganese dioxide in sulfuric acid, at an elevated temperature.

In general, the process of preparing our non-nitrated materials herein is conducted by agitating a mixture of the butylated cresol ether, aqueous sulfuric acid (20–60% H$_2$SO$_4$ content) and manganese dioxide at a temperature of about 50° to 90° C., for a period of time substantially to dissolve the manganese dioxide. This period may vary from 6 to 30 hours, or more. At the end of the reaction period the organic component is removed and worked up by customary procedures, such as distillation, to isolate the aldehyde.

The non-nitrated products as above formed are nitrated with a mixture of acetic acid, acetic anhydride and nitric acid. Temperatures between −10° and +20° C. give satisfactory results. There results diacetylated mono-nitro aldehydes, having the structural formula:

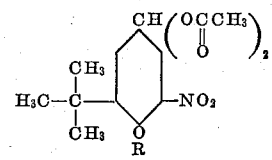

which are hydrolyzed with mineral acid to give the free aldehydes.

The following examples are given in order more fully to illustrate this invention without however limiting the same to them.

EXAMPLE I

*Preparation of 3-tertiary-butyl-4-methoxy toluene*

330 liters of iso butylene are passed into an agitated mixture of 1,464 grams p-cresol methyl ether and 75 grams sulfuric acid 93%, at a temperature of 22°–28° C., as rapidly as the absorption of the gas will permit. About 3 hours is required. The oily reaction mixture is washed with dilute caustic soda solution and then with water until it is neutral and is then distilled in vacuo. There is first obtained 73 grams of unreacted p-cresol methyl ether, boiling at 47° C. under 3 mm. of mercury pressure, followed by 2,105 grams of the desired product boiling at 78° C. under 3 mm. of mercury pressure. This product is a colorless oil having a congealing point of 16° C.

EXAMPLE II

*Preparation of 3-tertiary-butyl-4-methoxy benzaldehyde*

A mixture of 400 grams 3-tertiary-butyl-4-methoxy toluene, 221 grams manganese dioxide and 2,000 grams 30% sulfuric acid is agitated vigorously for 28 hours at a temperature of 62°–65° C. After cooling to room temperature the mixture is filtered to remove a small amount of unreacted manganese dioxide, the presence of which would impede the washing of the oily layer. The lower layer containing manganese sulfate and sulfuric acid is discarded and the upper oily layer is washed to neutrality with water and distilled, preferably in vacuo. There first passes over at 80°–82° C. under a pressure of 3 mm. of mercury about 226 grams of recovered 3-tertiary-butyl-4-methoxy toluene. After an intermediate fraction of about 4 grams there is then collected at 117°–122° C. under the same pressure about 187 grams of 3-tertiary-butyl-4-methoxy benzaldehyde, which rapidly solidifies to a solid mass. After recrystallization from half its weight of naphtha, there is obtained about 170 grams of purified aldehyde. It is a colorless crystalline material melting at 54°–55° C. and having a somewhat empyreumatic odor of the "cuir de Russe" type.

EXAMPLE III

*Preparation of 3-tertiary-butyl-4-methoxy-5-nitro benzaldehyde*

A solution of 48 grams of 3-tertiary-butyl-4-methoxy benzaldehyde in 50 grams acetic acid is added with agitation to a previously prepared solution of 70 grams acetic acid, 102 grams acetic anhydride and 41 grams nitric acid 96%, at a temperature of 0° to 15° C. When the addition is completed, quench the reaction mixture by pouring onto crushed ice. Filter off the resulting crystals, wash them free of acid with water and crystallize from approximately an equal weight of alcohol. There is thus obtained about 50 grams of the diacetyl derivative of 3-tertiary-butyl-4-methoxy-5-nitro benzaldehyde as pale yellow crystals of melting point 97°–98° C. In order to obtain the free aldehyde, the above described diacetyl derivative is stirred and heated at about 100° C. for one hour with a solution of 500 grams hydrochloric acid 15% and 25 grams alcohol. The mixture is then cooled to room temperature and the crystals of crude aldehyde filtered off, washed with water and crystallized from alcohol or naphtha. There is thus obtained about 32 grams of pure 3-tertiary-butyl-4-methoxy-5-nitro benzaldehyde as pale yellow crystals of melting point 58°–59° C., having a strong musk odor.

EXAMPLE IV

*Preparation of 3-tertiary-butyl-4-ethoxy toluene*

42 liters of isobutylene is passed into an agitated mixture of 204 grams p-cresol ethyl ether and 9 grams sulfuric acid 93%, at a temperature of 22°–28° C., as rapidly as the absorption of the gas will permit. About one hour is required. The oily reaction mixture is washed with dilute caustic soda solution and then with water until it is neutral and is then distilled in vacuo. There is first obtained 44 grams of unreacted p-cresol ethyl ether, boiling at 57° C. under 3 mm. of mercury pressure, followed by 224 grams of 3-tertiary-butyl-4-ethoxy toluene boiling at 84° C. under 3 mm. of mercury pressure. This product is a colorless oil having a mild characteristic odor. It has specific gravity (25° C.) .915 and upon slight cooling congeals to a crystalline mass of melting point 22° C.

EXAMPLE V

*Preparation of 3-tertiary-butyl-4-ethoxy benzaldehyde*

A mixture of 192 grams 3-tertiary-butyl-4-ethoxy toluene, 100 grams powdered manganese dioxide and 900 grams sulfuric acid 30% is agitated for 28 hours at a temperature of 60°–65° C. The mixture is then cooled to room temperature, thinned with 200 grams benzene and filtered to remove a small amount of unreacted manganese dioxide. The lower layer containing manganese sulphate and sulfuric acid is discarded and the upper layer is washed with dilute sodium carbonate solution and then with water to neutrality, the solvent distilled off and the remainder distilled in vacuo. There is first obtained 104 grams of unreacted 3-tertiary-butyl-4-ethoxy toluene, followed by 63 grams of 3-tertiary-butyl-4-ethoxy benzaldehyde boiling at 133° C. under 3½ mm. of mercury pressure. The aldehyde soon congeals to a solid mass. After recrystallization from half its weight of naphtha, there is obtained 60 grams of pure aldehyde as colorless needles of melting point 69°–70° C. It has an empyreumatic odor quite similar to that of 3-tertiary-butyl-4-methoxy benzaldehyde, but somewhat softer.

EXAMPLE VI

*Preparation of 3-tertiary-butyl-4-ethoxy-5-nitro benzaldehyde*

Proceeding as in Example III but substituting 51.5 grams of 3-tertiary-butyl-4-ethoxy benzaldehyde for the 3-tertiary-butyl-4-methoxy benzaldehyde used in that case, there is obtained 40 grams of the diacetyl derivative of 3-tertiary-butyl-4-ethoxy-5-nitro benzaldehyde as pale yellow crystals of melting point 129.5°–130° C., which upon hydrolysis and subsequent crystallization yield 26 grams of pure 3-tertiary-butyl-4-ethoxy-5-nitro benzaldehyde as pale yellow crystals of melting point 59°–60° C. having a strong musk odor.

The foregoing illustrates the practice of this invention which however is not to be limited thereby but is to be construed as broadly as permissible in view of the prior art and limited solely by the appended claims.

We claim:

1. Compounds having the structural formula:

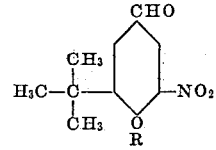

wherein R is from the group consisting of $CH_3$ and $C_2H_5$.

2. 3-tertiary-butyl-4-methoxy-5-nitro benzaldehyde.

3. 3-tertiary-butyl-4-ethoxy-5-nitro benzaldehyde.

4. The process for preparing compounds having the structural formula:

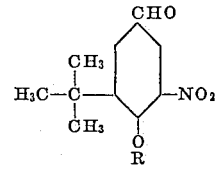

wherein R is selected from the group consisting of $CH_3$ and $C_2H_5$, which comprises treating the corresponding non-nitrated compounds with a mixture consisting of acetic acid, acetic anhydride and nitric acid at a temperature within the range of about −10° and +20° C., to form compounds having the structural formula:

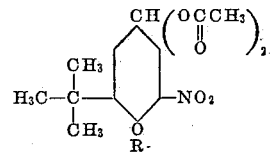

and hydrolyzing the latter to form the corresponding aldehydes.

5. The process of claim 4, wherein the temperature employed is within the range of about 0° C. to about 15° C.

6. The process of claim 5, wherein the material treated is 3-tertiary-butyl-4-methoxy benzaldehyde.

7. The process of claim 5, wherein the material treated is 3-tertiary-butyl-4-ethoxy benzaldehyde.

MARION SCOTT CARPENTER.
WILLIAM M. EASTER, JR.

REFERENCES CITED

The following references are of record in the file of this patent:

UNITED STATES PATENTS

| Number | Name | Date |
|---|---|---|
| 1,892,128 | Barbier | Dec. 27, 1932 |

OTHER REFERENCES

Poucher, "Perfumes, Cosmetics and Soaps," vol. I (1942). (Copy in Patent Office Division 43).

Nightingale, "Anomalous Nitration Reactions," Chemical Reviews, Feb. 1947. (Copy in Patent Office Div. 31.)